A. J. STEINER & W. A. KRAFFT.
DISPENSING DEVICE.
APPLICATION FILED JULY 1, 1916.

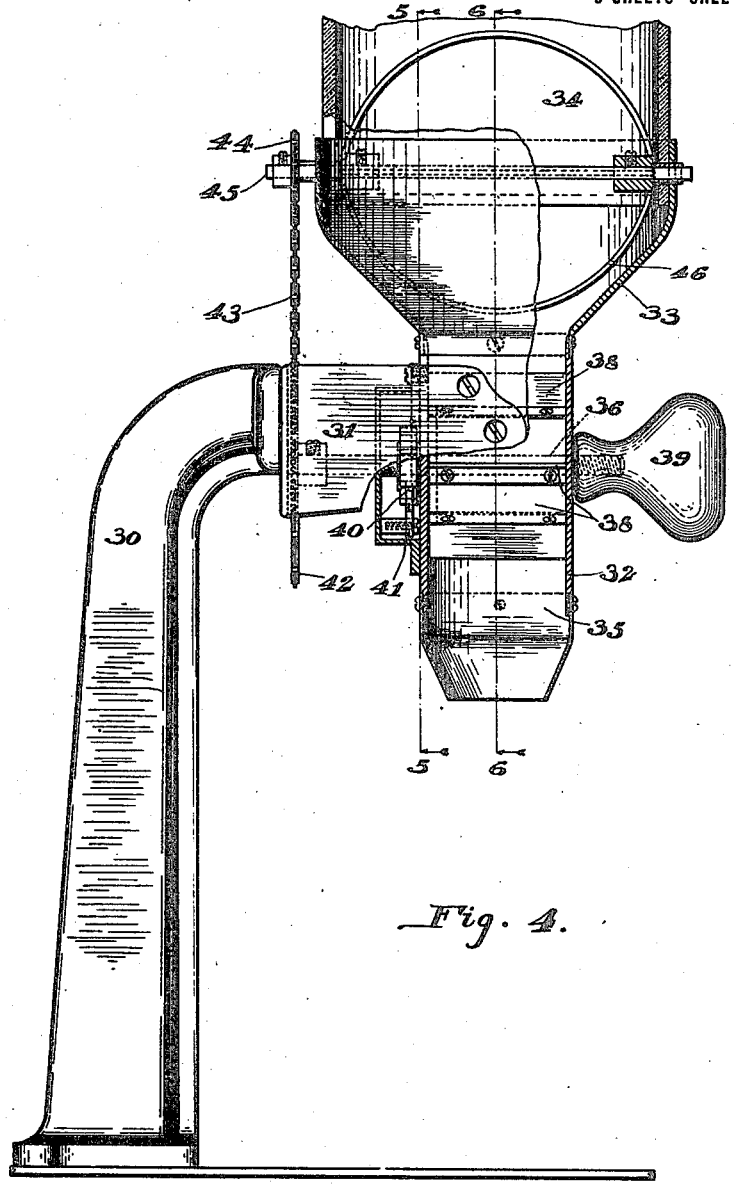

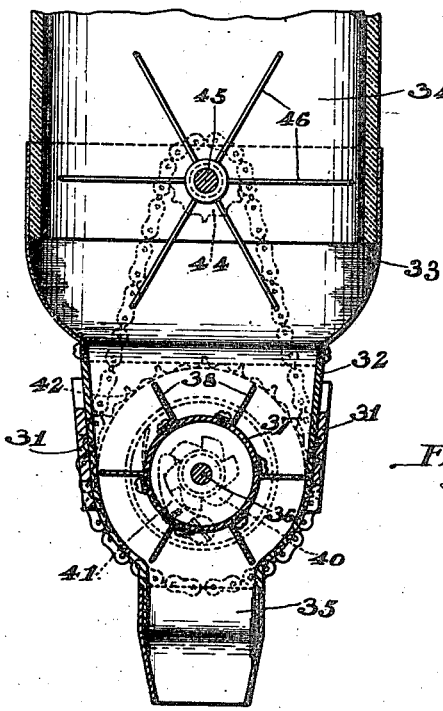

1,294,187.

Patented Feb. 11, 1919.
5 SHEETS—SHEET 5.

Witnesses:
J. M. Haines.
B. G. Richards.

Inventors,
Adolph J. Steiner,
Walter A. Krafft
by Joshua R. H. Potts
their Attorney.

UNITED STATES PATENT OFFICE.

ADOLPH J. STEINER AND WALTER A. KRAFFT, OF CHICAGO, ILLINOIS.

DISPENSING DEVICE.

1,294,187.   Specification of Letters Patent.   Patented Feb. 11, 1919.

Application filed July 1, 1916. Serial No. 107,117.

*To all whom it may concern:*

Be it known that we, ADOLPH J. STEINER and WALTER A. KRAFFT, citizens of the United States, and residents of the city of Chicago, county of Cook, and State of Illinois, have invented certain new and useful Improvements in Dispensing Devices, of which the following is a specification.

Our invention relates to improvements in dispensing devices, and has for its object the provision of an improved device of this character, especially adapted for dispensing powders such as malted milk, or the like.

The invention consists in the combinations and arrangements of parts hereinafter described and claimed.

Figure 1:
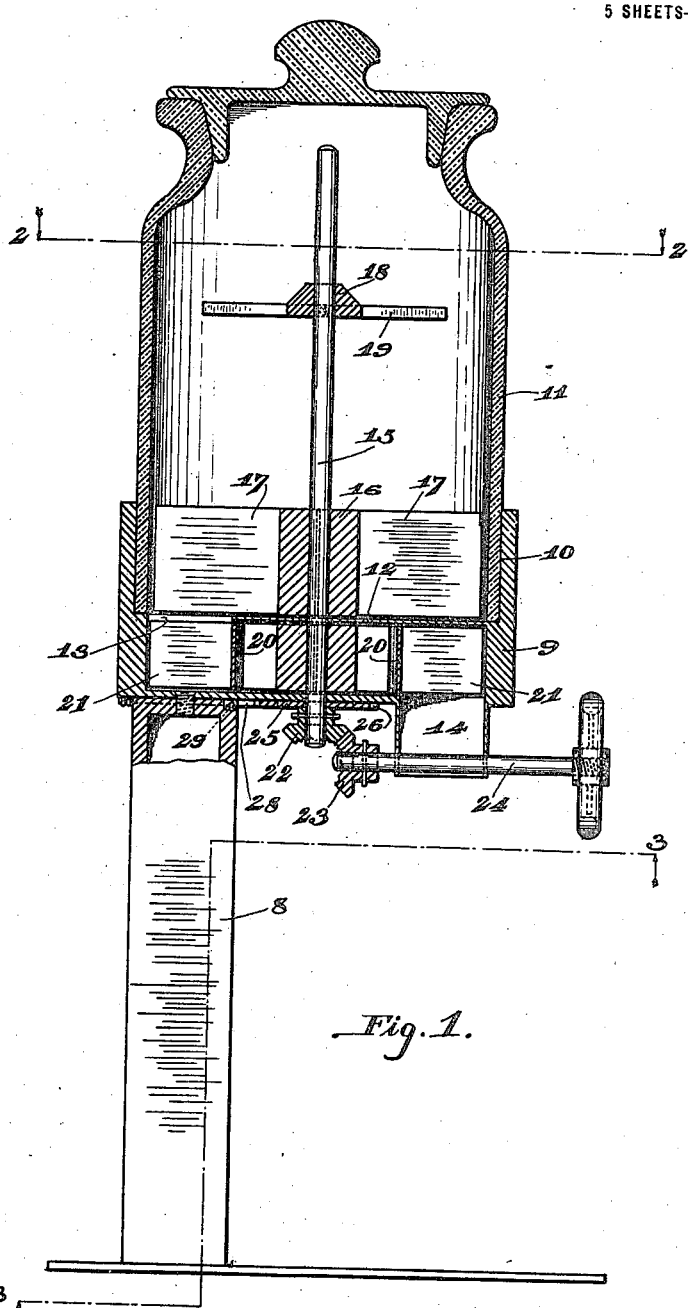
Figure 2:
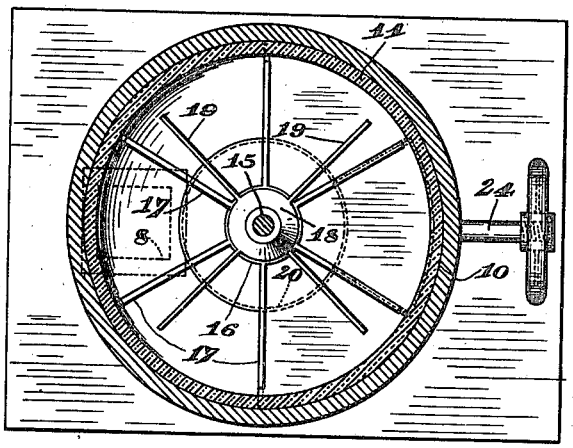
Figure 3:
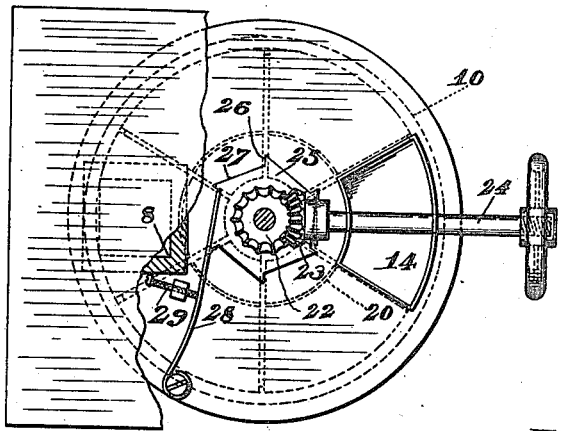
Figure 7:
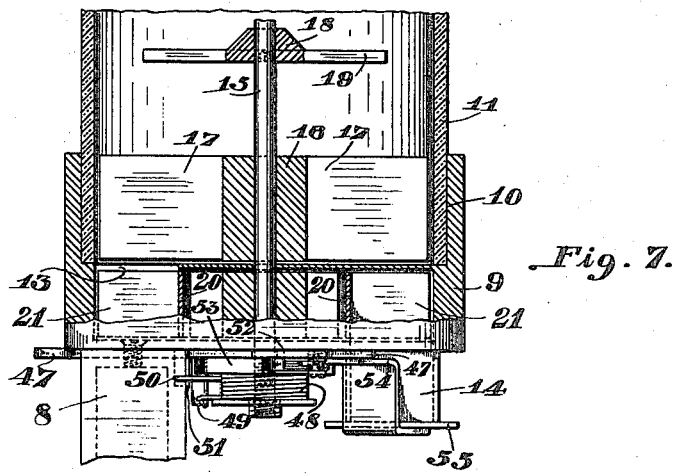
Figure 7A:
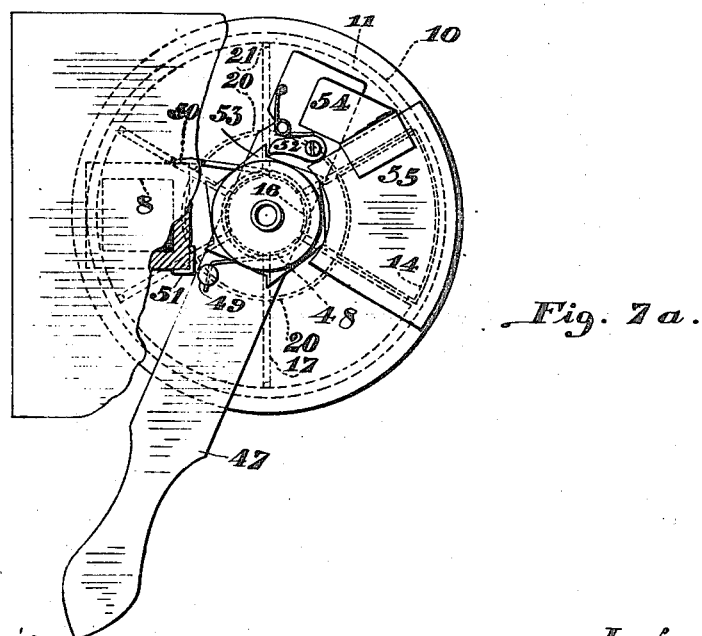

The invention will be best understood by reference to the accompanying drawings forming a part of this specification, and in which, Figure 1 is a vertical section, shown partially in elevation of a device embodying our invention, Fig. 2, a section taken on line 2—2 of Fig. 1, Fig. 3, a section taken on line 3—3 of Fig. 1, Fig. 4, a vertical section, shown partially in elevation, of a modified form of construction, Fig. 5, a section taken on line 5—5 of Fig. 4, Fig. 6, a section taken on line 6—6 of Fig. 4, Fig. 7, a partial vertical section similar to Fig. 1, of another modified form of construction, and Fig. 7ª, a bottom plan view of the same with portions broken away.

The form of construction illustrated in Figs. 1 to 3 inclusive, comprises a suitable standard 8 adapted to rest upon a counter, show-case or the like, and carrying at its upper end a housing 9 having a socket 10 in the top thereof to receive the lower end of a bottomless glass jar 11. A horizontal partition 12 is provided in housing 9 dividing the same into an upper and a lower chamber, there being a discharge passage 13 through one side of said partition. A discharge spout 14 is arranged at the other side of the housing 9 leading from the bottom thereof. A vertical shaft 15 is arranged in housing 9 and is provided above the partition 12 with a central hub 16 carrying radiating blades 17 adapted to effect discharge of material through passage 13 when the shaft 15 is rotated. The shaft 15 also carries a central hub 18 and radiating agitator blades 19 positioned in the upper central portion of the jar 11 for agitating the material in said jar and facilitating the feeding of the same therefrom. A central hub 20 is also arranged on shaft 15 below partition 12 and is provided with radiating measuring blades 21 forming measuring compartments corresponding in size and shape to the passages 13 and 14, as indicated. The shaft 15 is extended below the housing 9 where it is provided with a bevel gear 22 meshing with a bevel gear 23 on an operating shaft 24, extending from one side of the housing 9. A ratchet wheel 25 is also provided on the lower end of shaft 15, said ratchet wheel being provided with a plurality of stop shoulders 26 and flat surfaces 27, as indicated. A leaf spring 28 is secured to the bottom of the housing 9 in position to rest upon the flat surfaces 27 behind the shoulders 26, as the shaft 15 is rotated, a set screw 29 being provided for adjusting the tension of said spring.

By this arrangement, it will be observed, that the shaft 15 may be readily rotated when desired by means of the operating shaft 24, and will effect accurate feed of material through discharge spout 14. The ratchet 25 is so arranged on shaft 15 with reference to the blades 21, that, when the spring 28 is resting flat upon one of the surfaces 27, a corresponding space between two of the blades 21 is in registration with the discharge spout 14 and another space between another set of said blades is in registration with the passage 13, thus readily indicating to the operator the proper position of the parts to effect complete discharge of a measured quantity of the contents of jar 11.

The form of construction illustrated in Figs. 4, 5 and 6 comprises a suitable standard 30 adapted to rest upon a counter, table or the like, and provided at its upper end with a bifurcated bracket 31 embracing and securing a housing or casing 32. The housing 32 is provided, at its upper end, with a bell-shaped socket 33 adapted to receive the lower end of the bottomless glass jar 34, and at its lower end with a discharge spout 35. A horizontal shaft 36 is extended through housing 32 and is provided with a central hub 37 carrying radiating blades 38 forming measuring spaces coöperating with the discharge spout 35 to deliver measured quantities of material, through said spout, as will be readily understood. The shaft 36 is provided, at its outer end, with an operating knob or handle 39 and adjacent the inner side of housing 32 with a ratchet 40 coöperating with a spring held pawl 41 to properly position the measuring blades 38 for discharge through spout 35. Shaft 36 carries a sprocket wheel 42 connected by a sprocket chain 43 with a sprocket 44 on a horizontal shaft 45 extending through the upper portion of socket 33 parallel with shaft 36. Shaft 45 is provided with agitator blades or members 46 adapted to effect agitation of the material in jar 34 when shaft 36 is rotated.

By this arrangement, it will be observed, that by rotating shaft 36, measured quantities of material may be delivered through discharge spout 35, and the material in the jar 34 kept constantly agitated to prevent caking or clogging.

The form of construction illustrated in Figs. 7 and 7ª, is identical with that illustrated in Figs. 1, 2, and 3, except that a different form of operating means is employed. In this instance the operating lever 47 is loosely mounted on the lower end of shaft 15 and is equipped with a coiled spring 48 having one end secured to a pin 49 on the under side of lever 47 and the other end 50 resting against the side of standard 8. The tension of spring 48 is arranged to yieldingly hold the lever 47 against the stop 51 on one side of standard 8, and said lever is arranged to contact with the other side of said standard upon swinging thereof, so as to fix a certain arc of swing for lever 47. A spring held pawl 52 is also mounted on lever 47 and coöperates with a ratchet 53 secured to shaft 15 adjacent lever 47, the arrangement being such that upon oscillation of lever 47, the shaft 15 is rotated sufficiently to effect discharge of one of the measuring spaces between blades 17. The lever 47 also carries a depending bracket 54 provided with a segmental shutter 55 arranged to oscillate across the bottom of discharge spout 44, the arrangement being such that when lever 47 is in its normal position of rest, the shutter 55 closes the lower end of spout 44, thus preventing access of air and moisture to the contents of the device. By this arrangement the contents of jar 11 may be readily delivered in measured quantities and deterioration thereof prevented.

While we have illustrated and described the preferred forms of construction for carrying our invention into effect, these are capable of variation and modification without departing from the spirit of our invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A dispensing device comprising a standard; a housing on said standard the upper part of which constitutes a reservoir-receiving support; a reservoir in said housing adapted to contain a powder substance; a horizontal partition in said housing, dividing the same into an upper and a lower chamber and constituting the bottom of said reservoir; a discharge passage through one side of said partition; a discharge passage through the opposite side of the bottom of said housing; a vertical shaft extending through said housing and into said reservoir; measuring blades on said shaft immediately above and below said partition and revolving relatively thereto; and means for rotating said shaft, substantially as described.

2. A dispensing device comprising a standard; a housing on said standard the upper part of which constitutes a reservoir-receiving support; a reservoir in said housing adapted to contain a powder substance; a horizontal partition in said housing, dividing the same into an upper and a lower chamber and constituting the bottom of said reservoir; a discharge passage through one side of said partition; a discharge passage through the opposite side of the bottom of said housing; a vertical shaft extending through said housing and into said reservoir; measuring blades on said shaft immediately above and below said partition and revolving relatively thereto; a beveled gear on the bottom of said shaft; and an operating shaft mounted below said housing and carrying the beveled gear meshing with said first mentioned beveled gear, substantially as described.

In testimony whereof we have signed our names to this specification in the presence of two subscribing witnesses.

ADOLPH J. STEINER.
WALTER A. KRAFFT.

Witnesses:
 JOSHUA R. H. POTTS,
 ANTHONY A. OLSON.